United States Patent
Eriksson et al.

(10) Patent No.: US 10,781,696 B2
(45) Date of Patent: Sep. 22, 2020

(54) TURBOMACHINE COMPONENT WITH RADIALLY INWARD PROJECTING STRUT COOLING FEATURES

(71) Applicant: Siemens Aktiengesellschaft, Munich (DE)

(72) Inventors: Jonas Eriksson, Finspång (SE); Andreas Graichen, Norrköping (SE); Nicklas Johansson, Skärblacka (SE); Jenny Larfeldt, Finspång (SE); Jan-Erik Lundgren, Svärtinge (SE); Daniel Lörstad, Finspång (SE); Erik Munktell, Finspång (SE)

(73) Assignee: Siemens Aktiengesellschaft, Munich (DE)

( * ) Notice: Subject to any disclaimer, the term of this patent is extended or adjusted under 35 U.S.C. 154(b) by 266 days.

(21) Appl. No.: 15/753,247

(22) PCT Filed: Jul. 29, 2016

(86) PCT No.: PCT/EP2016/068147
§ 371 (c)(1),
(2) Date: Feb. 16, 2018

(87) PCT Pub. No.: WO2017/045823
PCT Pub. Date: Mar. 23, 2017

(65) Prior Publication Data
US 2018/0245471 A1    Aug. 30, 2018

(30) Foreign Application Priority Data
Sep. 16, 2015    (EP) .................................... 15185490

(51) Int. Cl.
*F23R 3/00*    (2006.01)
*F01D 5/18*    (2006.01)
(Continued)

(52) U.S. Cl.
CPC ............ *F01D 5/187* (2013.01); *F01D 25/145* (2013.01); *F23R 3/002* (2013.01); *F23R 3/005* (2013.01);
(Continued)

(58) Field of Classification Search
CPC ............ F05D 2230/31; F05D 2260/20; F05D 2260/204; F23R 3/283; F23R 2900/03043;
(Continued)

(56) References Cited

U.S. PATENT DOCUMENTS 4,187,674 A * 2/1980 Richardson ............... F23R 3/10
                                                    60/743
4,934,145 A * 6/1990 Zeisser ................... F23R 3/002
                                                    60/740
(Continued)

FOREIGN PATENT DOCUMENTS

CN    104040260 A    9/2014
EP    1533113 A1    5/2005
(Continued)

OTHER PUBLICATIONS

EP Search Report dated Mar. 30, 2016, for EP patent application No. 15185490.8.
(Continued)

*Primary Examiner* — Scott J Walthour
*Assistant Examiner* — Todd N Jordan
(74) *Attorney, Agent, or Firm* — Wolter Vandyke Davis, PLLC

(57) ABSTRACT

A turbomachine component, gas turbine combustor component, or burner component, including a body with a first, second and third section, the sections being integrally formed with another and built from a same material, and an end face of the first section of the body. The end face, during
(Continued)

operation, is exposed to a first temperature higher than a second temperature of a cooling fluid. The second section is located between the first and third section and is formed in parts as a lattice structure. The lattice structure has a plurality of rod-shaped struts, wherein each of a first set of the plurality of struts has a first end, the first end being connected to the first section, and a void penetrated by the plurality of struts, the void providing at least one fluid passage via which the cooling fluid is guidable through an interior of the second section during operation.

21 Claims, 5 Drawing Sheets

(51) Int. Cl.
    *F01D 25/14*     (2006.01)
    *F23R 3/28*     (2006.01)
    *F23R 3/06*     (2006.01)
    *F02C 3/06*     (2006.01)

(52) U.S. Cl.
    CPC ............... *F23R 3/06* (2013.01); *F23R 3/283* (2013.01); *F02C 3/06* (2013.01); *F05D 2240/35* (2013.01); *F05D 2260/232* (2013.01); *F23R 2900/00018* (2013.01); *F23R 2900/03042* (2013.01); *F23R 2900/03043* (2013.01)

(58) Field of Classification Search
    CPC ............ F23R 2900/03045; F23R 3/002; F23R 2900/03041; F23R 2900/03042; F01D 5/187
    See application file for complete search history.

(56) References Cited

U.S. PATENT DOCUMENTS

| | | | | |
|---|---|---|---|---|
| 5,941,076 | A * | 8/1999 | Sandelis | ................ F23R 3/002 60/752 |
| 6,973,419 | B1 * | 12/2005 | Fortin | ..................... F23R 3/002 477/30 |
| 9,556,795 | B2 * | 1/2017 | Ryon | ..................... F23R 3/283 |
| 10,101,029 | B2 * | 10/2018 | Propheter-Hinckley | ..................... F23R 3/002 |
| 10,371,381 | B2 * | 8/2019 | Xu | ....................... F23M 20/005 |
| 10,400,674 | B2 * | 9/2019 | Xu | ............................. F02C 6/08 |
| 2003/0213250 | A1 | 11/2003 | Pacheco-Tougas et al. | |
| 2005/0076644 | A1 | 4/2005 | Hardwicke et al. | |
| 2007/0275210 | A1 * | 11/2007 | Heselhaus | ............... F01D 5/288 428/116 |
| 2008/0115506 | A1 * | 5/2008 | Patel | ...................... F02C 3/145 60/804 |
| 2010/0064693 | A1 * | 3/2010 | Koenig | ..................... F23R 3/26 60/760 |
| 2011/0083442 | A1 * | 4/2011 | Khan | ....................... F23R 3/283 60/772 |
| 2012/0237786 | A1 | 9/2012 | Morrison et al. | |
| 2013/0160453 | A1 | 6/2013 | Kimura et al. | |
| 2014/0216042 | A1 | 8/2014 | Hanson | |
| 2019/0346140 | A1 * | 11/2019 | Kiener | .................... F23D 14/78 |

FOREIGN PATENT DOCUMENTS

| | | |
|---|---|---|
| EP | 1533475 A2 | 5/2005 |
| JP | 2003336845 A | 11/2003 |
| JP | 2011080753 A | 4/2011 |
| WO | 2013188388 A2 | 12/2013 |
| WO | 2015058043 A1 | 4/2015 |

OTHER PUBLICATIONS

International Search Report dated Nov. 28, 2016, for PCT/EP2016/068147.

International Preliminary Report on Patentability dated Jan. 4, 2018, for PCT/EP2016/068147.

\* cited by examiner

TURBOMACHINE COMPONENT WITH RADIALLY INWARD PROJECTING STRUT COOLING FEATURES

CROSS REFERENCE TO RELATED APPLICATIONS

This application is the US National Stage of International Application No. PCT/EP2016/068147 filed Jul. 29, 2016, and claims the benefit thereof. The International Application claims the benefit of European Application No. EP15185490 filed Sep. 16, 2015. All of the applications are incorporated by reference herein in their entirety.

FIELD OF THE INVENTION

The invention relates to a turbomachine component, particularly a gas turbine component, even more particularly a gas turbine combustor or burner component, in which a hot surface can be cooled via a specific internal hollow structure of the turbomachine component. Furthermore the invention relates to a method for manufacturing such a component and of operation of such a component.

BACKGROUND OF THE INVENTION

Gas turbine engines like other rotating machines or turbomachines comprise sections in which high temperatures are experienced during operation.

In the gas turbine engine typically ambient air as a fairly cool fluid may be compressed by a compressor section and provided to a combustor in which the substantially cool fluid (the temperature may be several hundred degree Celsius but at least cooler than the working conditions within the combustor of the gas turbine engine) will be burned together with fuel to provide a driving force for a subsequent turbine section in which a hot fluid from the combustor will drive rotor blades of the turbine to drive again a shaft.

In the combustor or in the downstream sections past the combustor hot temperatures can occur on components that are guiding the hot fluid through the gas turbine engine. The temperatures can be up to 1,500° C. or even higher. Nevertheless, materials used typically in a gas turbine engine cannot withstand temperatures above 800° C. Therefore, these components may need to be cooled or a specific coating is required to protect the component. Cooling may be implemented in a way that a fraction of the air or the fluid from the compressor is extracted—i.e. branched off from a main fluid path—and guided to the component which needs to be cooled. Cooling then can be performed at the to be cooled part by different measures, for example impingement cooling, film cooling, effusion cooling, transpiration cooling and/or convection cooling.

The provision of cooling functionality on the other hand reduces the efficiency of the gas turbine engine. Therefore it is the goal to limit the cooling as much as possible so that the efficiency does not downgrade and is maximised. But it has to be appreciated that the lifetime of the component depends largely on that the component will not experience a temperature that goes above an expected temperature level.

The temperature level experienced by a component may vary at different locations within the engine. For example an upstream region of a combustion liner wall may experience hotter temperatures than a downstream region of the same combustion liner. The hottest regions in a gas turbine engine are located in the combustor.

Generally, components to be cooled in a gas turbine engine are substantially parts in the combustion chamber, the turbine section and a transition piece, i.e. a transition duct located between the combustion chamber and the turbine section. Other type of machines may experience heat at different locations so that a similar need for cooling may exist also there as well.

Patent publication WO 2015/058043 A1 shows a hollow turbine blade in which supports as cast elements are inserted between a suction side and a pressure side of the blade. The separately manufactured components are joined together. The aim is mainly to create sufficient load resistance by the solid supports. The supports act also as barriers for cooing air.

Patent publication EP 1 533 113 A1 shows a layer system which comprises a substrate covered with a porous—honeycomb like—layer in which the pore walls adjacent to the substrate surface have a greater cross-sectional area than those not adjacent to the substrate surface. The porous structure may be applied to the substrate and further may be coated from another end.

In patent publication US 2005/0076644 A1 a porous material is shown to be used in a burner, e.g. in spaces between burner components or for a support plate. This allows to reduce noise emissions.

It is an aim to provide a cooling mechanism that provides an improved cooling.

SUMMARY OF THE INVENTION

The present invention seeks to provide an improved cooling solution, usable particularly for combustors.

This objective is achieved by the independent claims. The dependent claims describe advantageous developments and modifications of the invention.

In accordance with the invention there is provided a turbomachine component, particularly a gas turbine component like a heat shield or a blade or a guide vane, even more particularly a gas turbine combustor or burner component like a combustion liner or a burner tip or a burner front face, which comprises a body with a first, a second and a third section. The first, second and third section are integrally formed with another, i.e. they are single or unitary or monolithic piece. They are portions of the monolithic body. They are also made from a same material. Furthermore the component comprises an end face of the first section of the body, wherein the end face, during operation, is exposable to a first temperature higher than a second temperature of a cooling fluid. The cooling fluid may preferably be air, possibly provided from a compressor of the gas turbine engine. The second section is located between the first and the third section and is formed in parts as a lattice structure. Such a lattice structure comprises a plurality of rod-shaped struts, wherein each of a first set of the plurality of struts has a first end, the first end being connected to the first section, and a void penetrated by the plurality of struts, the void providing at least one fluid passage via which the cooling fluid is guidable through an interior of the second section during operation.

As said, the invention is particularly applicable for combustor components that are exposed to combustor environment, i.e. by radiation and/or convection heat of combustion flames. It may be applied to burners, heat shields or liners.

It may particularly be used where a flame, either main or pilot flame, are heating via convection and radiation adjacent surfaces.

Furthermore the invention relates to a method for manufacturing of a turbomachine component comprising the steps of generating the turbomachine component as previously defined as an integrally formed—i.e. monolithic—component via additive manufacturing techniques, particularly selective laser sintering or selective laser melting or electronic beam melting, i.e. therefore building layer by layer a single component. By these additive manufacturing techniques even a complex lattice structure can be built. Besides, integrally formed components can be built as applied powder is melted during production and solidifies to a single piece.

Particularly the overall body including its three sections and including the struts may be built by a common additive manufacturing process. In consequence the body is built by just a single manufacturing method. Thus, the sections are not built separately and joined in a consecutive step.

The first section and the third section can be considered to be a casing for the lattice structure. The first section and the third section can provide a mechanical structure to which the struts can be connected and can define an enclosure for the lattice structure so that the cooling fluid can pass and is guided through the lattice structure. The first section may also act as a boundary wall to the combustion zone. The third section can be a further wall, e.g. for mounting the body to further components.

The end face may particularly be a surface that is opposite to a space in which hot temperatures may occur. This may particularly be a combustion zone in which hot combustion will be performed during operation of a combustion chamber of a gas turbine engine. This may also be a pre-mixing zone of the combustor. Typical combustion temperatures may be between 1300 and 2000° C. Such elevated temperatures may require specific cooling. This cooling is provided according to the invention by the lattice structure through which a cooling air or a cooling fluid can be guided. This cooling fluid can particularly be air extracted from a combustor of the gas turbine engine. The exit temperature of a compressor may still be 350 to 550° C. but definitely will be below the combustion temperatures so the fluid has such a low temperature compared to the combustion temperatures so that it provides sufficient cooling if guided through the lattice structure.

The third section may be located in a region of a lower temperature compared to the temperature of the first section.

The lattice structure is a complex space which is enclosed by walls through which air or cooling fluid can be guided. Struts are present in the lattice structure. The struts provide sufficient heat conduction so that the elevated temperatures from the first section—to which the struts are connected—are brought into the lattice structure via the struts. The heat internal to the struts can be conveyed by passing-by cooling fluid through the void of the lattice structure. The void penetrated or pierced by the plurality of struts defines the flow path in form of a meander. The cooling fluid is passing by a large number of struts and thereby winds through the lattice structure and providing a good heat transfer for cooling the first section of the body of the turbo machine component.

The struts are rod-shaped. The struts in this shape can also be called pylons. The struts may be columnar. The struts, at least in parts, may be cylindrical. These configurations are beneficial as cooling fluid can pass along the full circumference of the respective strut.

The struts act as cooling struts. The hot struts are cooled from a cooling fluid guided along surfaces of the cooling struts.

The lattice structure may be preferably generated by additive manufacturing technology like selective laser sintering (SLS) or selective laser melting (SLM). Alternatively electron beam melting (EBM) can be used. These additive manufacturing techniques allow very complex structures that cannot be generated by previous known techniques like cutting or drilling into a solid body.

To provide a cooling air flow through the lattice structure there may be provided a cooling inlet—preferably through the third section—and a cooling outlet—preferably through the first section—, wherein the cooling inlet provides a cooling fluid into the lattice structure whereas the cooling outlet allows the exit of the cooling fluid from the lattice structure. The outlet may pierce the first section and will release the cooling fluid preferably into the combustion zone. The cooling inlet may be an inlet port through a wall of the second section—if there will be a wall in the second section—or through a wall of the third section.

The fluid passage may be, at least partially, substantially transverse to an expanse of strut. Thus, the struts may extend into the fluid passage.

The plurality of struts may have several set of similarly arranged strut structures, for example being periodical. Alternatively the struts may also be arranged in a chaotic pattern which allows a complex flow path of the cooling fluid through the lattice structure.

The struts may be arranged as solid cylinders. Additionally or alternatively the struts may at least have a conical section or may be completely conical. In such a design, the part with the widest cross sectional area of the cone may be arranged in direction of the first section. The cone may again be a solid structure meaning that the cone of the strut will not be hollow. The cone may be defined by an angle of its lateral surface between 2° and 45°. Preferably the range of the angels is between 5° and 30°. The angle may be taken between a rotational axis of the cone and its lateral surface. The angle may specifically be the interior angle at the tip end of the cone.

If the strut has only two sections, a conical section and a cylindrical section, the cone may be arranged as a truncated cone in which the truncated top may merge to the cylindrical form of the remainder of the strut without any step. In such a case, the conical part may be 5 to 50% of the overall length of the strut. The remainder of the strut may be cylindrical. This allows a good heat transfer from the first section into the lattice structure through which the cooling fluid will be guided.

The plurality of struts may be preferably arranged perpendicularly to the end surface or end face of the first section. Alternatively the struts may be angled in relation to the end face. The angle in relation to a normal of the end face may be larger than 0° and up to 45°. That means if you define the orientation of the strut as a Euclidian vector, you can say that the larger vector component of the vector is directed parallel to the normal of the end face whereas the smaller vector component of the vector is in direction parallel to the end face.

Preferably a first subset and a second subset of the first set of the plurality of struts are staggered. Therefore cooling air will need to wind through the first and the consecutive second subset of struts so that an improved heat transfer occurs.

Struts may intersect each other—particularly if one set of struts is angled in respect of another set of struts—or parallel struts may be connected via crossbars between the struts. This could lead to a better heat transfer and/or to a better stability of the lattice structure.

As thermal loads could occur since temperature gradients could lead to a volume expansion of the hotter parts which again leads to stress in the material the plurality of struts could be arranged in a semi-detached way such that only one end is connected to the first section whereas the other end of the struts is free from further connections, particularly not connected to the third section.

You could define the second section with a lattice structure as a body in which a specific percentage of the volume is consumed by solid parts of the lattice whereas another percentage of the body is taken by the void of the lattice. The material of the first and third section and other walls of the second section is not considered in the further analysis. As one preferred example, this consumption of material compared to void may be substantially equal, i.e. 50% to 50%.

In another example the volume rate of solid material in the second section in relation to the void in the second section may be between 15% and 85%, preferably between 25% and 65%. In yet another embodiment possibly the ratio may only take 35% to 50%. These different configurations may be adapted for the specific needs of a component and adapted for the pressure and to put of the cooling fluid through the lattice structure. Note that this ratio value can even go beyond 100%.

This calculation can also be given as a volume ratio between the volume consumed by solid material ($V_{solid}$) and the overall volume of the second section ($V_{total}$)—thus the solid space and the void space. This volume ratio of $V_{total}/V_{solid}$ may be preferably between 20% and 40%. The lower value of the ratio may alternatively be 10%, 15%, 25%, or 35%. The upper value of the ratio may alternatively be 35%, 45%, 50%, or 55%. All kinds of combinations of lower and upper value may be possible, as long as mathematical feasible.

Also the area for where the lattice meets the cooling side can be evaluated. $A_{solid}$ may be the overall cross section of the lattice area consumed by the struts at the to be cooled side, i.e. near or at the first section. This defines the area of the connecting points of the struts. $A_{void}$ may be the overall cross section of the lattice area taken by the void at the cooling side, i.e. near the third section. $A_{total}$ may be the complete surface area consumed by both $A_{solid}$ and $A_{void}$. According to this definition a preferred ratio of $A_{solid}/A_{total}$ may be between 30% and 50% or, in other words $A_{solid}/A_{void}$ may be between 50% and 100%.

Again, alternative values could be taken for different machines. E.g. the lower value of the range $A_{solid}/A_{total}$ could be 20%, 25%, 35%, or 40%, the upper value of the range $A_{solid}/A_{total}$ could be 40%, 45%, 55%, or 60%. All kinds of combinations of lower and upper value may be possible, as long as mathematical feasible.

In a specific embodiment a ratio between a volume of the void and a volume of solid material of the lattice structure in the second section may be reduced in direction to the end face. Therefore, a higher amount of solid material will be present closer in the direction of the first section whereas a lesser dense structure is provided in the lattice structure in the direction of the third section. This may be preferably used to provide even a better cooling of the heated first section.

In general a cooling fluid will automatically be guided through the lattice structure due to pressure differences by the inlet and outlet port.

It may be preferable to generate a cross flow of the cooling fluid through the lattice structure substantially parallel to the end face of the first section. For providing such a cross flow it may be preferred to have inlet and outlet ports for the cooling fluid into or from the lattice structure in such a way that the ports are offset to each other. By such an offset cooling fluid will be injected into the lattice structure and then the cooling fluid may need to flow substantially parallel to the end face, until the fluid approaches a region of the outlet port. The cooling fluid may be guided through an outlet port which is not aligned to the inlet port. Optionally there may be walls and wings within the lattice structure that could support directing the cooling flow within the lattice structure.

The component to be cooled may have one single complex cavity defined by the lattice structure. Alternatively there may be several separate compartments of lattice structures that are each enclosed by walls so that they are separate and act independently from each other. Each of such a compartment may have its own inlet and outlet port. If the turbo machine component will experience different temperature levels at different regions possibly also different lattice structure design can be applied according to the temperature distribution along the compartments of the turbo machine component.

The cooling fluid which is guided through the lattice structure may be exhausted into the combustion zone if this invention is applied to a burner or to a combustor. In such a configuration the cooling fluid may additionally be used as a chemical component for the combustion in the combustion zone so that it gets mixed with the fuel, so that the mixed fluid is burned within the combustion zone. In the specific configuration this cooling fluid may be called pilot air which is provided into a region where the pilot fuel of a combustor is injected into the combustion space.

The lattice structure itself is specifically used for cooling. Therefore no fuel and air mix should occur within the lattice structure.

The invention may also relate to a method of manufacturing and a method of operating such a cooled turbo machine component.

The lattice structure is typically made of metal built via additive manufacturing. Such a metal lattice structure particularly shall not be considered similar to a configuration made of sheet metal which has ribs attached to the sheet metal so that large hollow spaces are generated between two parallel ribs of sheet metal. A lattice structure may be particularly be a much more complex structure with a large number of small struts which are more the type of a pillar and not the type of an expanded wall.

To distinguish from prior art designs with ribs on combustion liners, there may be 5, 10, 20, 30 or even 40 struts per square centimeter, thus there are a high number of struts present in the lattice structure. The struts specifically are not simply spacers to connect and keep distant to another two parallel walls, e.g. of a combustion liner in a dual wall configuration. The number of struts is much higher that the number of spacers of prior art designs.

As indicated before the invention also relates to a method of operation of such a turbomachine component in which cooling fluid is provided through the void so that the plurality of rod-shaped struts are affected by convection cooling. Particularly due to pressure differences the cooling fluid is guided through the void, in particular by creating a cross-flow with the struts erecting into the cross-flow.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

Furthermore examples have been and will be disclosed in the following sections by reference to gas turbine engines. The invention is also applicable for any type of turbomachinery, e.g. compressors, pumps or steam turbines. Furthermore the general concept can be applied even more generally to any type of machine in which elevated temperatures occur. It can be applied to rotating parts as well as stationary parts.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying drawings, of which.

The illustration in the drawing is schematical. It is noted that for similar or identical elements in different figures, the same reference signs will be used.

Some of the features and especially the advantages will be explained for an assembled and operating gas turbine, but obviously the features can be applied also to the single components of the gas turbine or even other turbo machines but may show the advantages only once assembled and during operation. But when explained by means of a gas turbine during operation none of the details should be limited to a gas turbine while in operation.

DETAILED DESCRIPTION OF THE INVENTION

Figure 1:
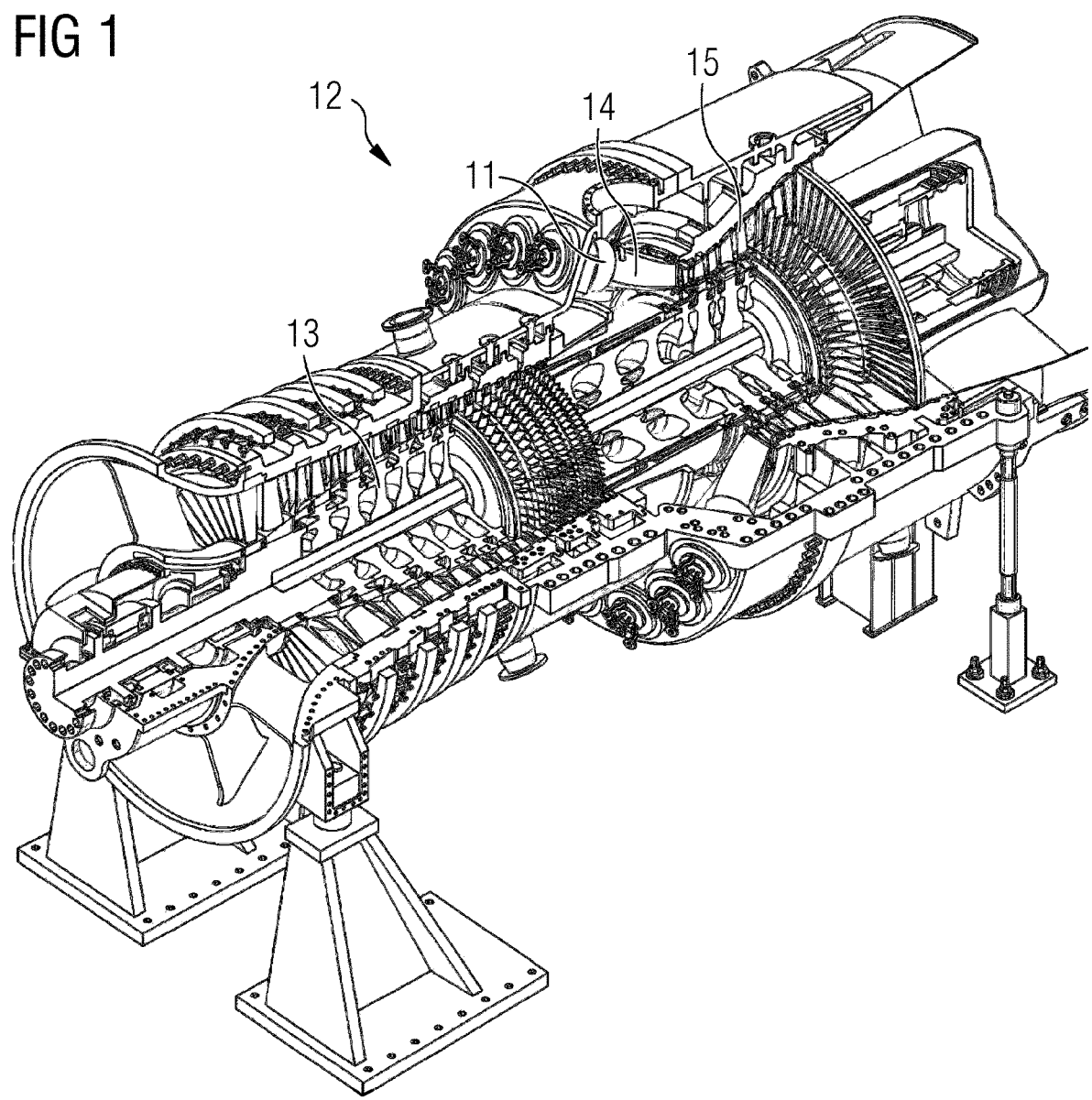
FIG. 1: shows schematically of an exemplary gas turbine engine.

Referring now to FIG. 1, FIG. 1 shows a schematic view of an exemplary gas turbine 12. The gas turbine 12 (also called gas turbine engine) comprises a compressor 13, a combustion chamber 14 and a turbine 15 as it is known per se. In this gas turbine 12 the burner 11—for example comprising a pilot burner—is arranged in front of the combustion chamber 14.

Figure 2:
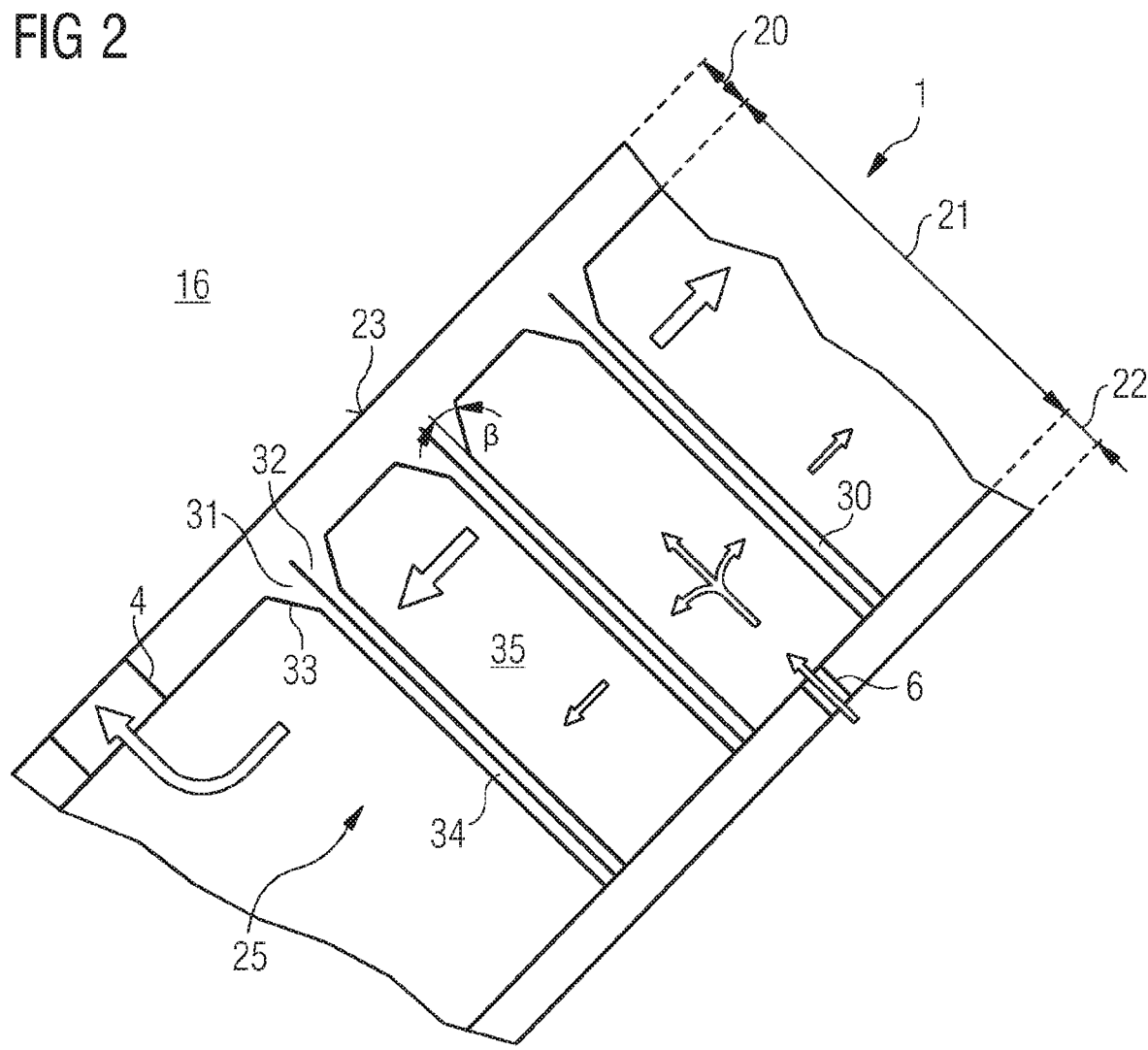
FIG. 2: shows a sectional view of a burner head and illustrates an enclosed lattice structure.

FIG. 2 shows an example of a lattice structure according to the invention in an abstract and sectional view. A section of a burner head as the turbo machine component 1 is shown including a body 2 comprising a first section 20, a second section 21 and a third section 22. All these sections are portions of a common monolithic body. The first section 20 is that section of the body 2 that is closest to a hot region, in this example closest to the combustion zone 16. The first section 20 comprises an end face 23 that is directly facing the combustion zone 16. The second section 21 comprises the lattice structure 25 which is shown in an exemplary way by showing just three struts. The lattice structure 25 will be explained in more detail below. Adjacent to the second section 21, the third section 22 is present that limits—and in parts also seals—the region of the lattice structure 25 in the direction distant to the combustion zone 16. The lattice structure 25 is defined as a void 35 which is penetrated by a plurality of struts 30. In the figure only three struts are shown in this cross sectional plane in this limited region which is displayed in the figure. Nevertheless the struts should be continued repetitively both in directions into the drawing plane and also in direction lateral to the drawing plane. Each strut has a first end 31 which is connected to the first section 20. In the example the first end 31 is also defined by a conical portion or a conical shape 32. Therefore the strut 30 is increased in diameter when getting closer to the first section 20.

The void 35 is particularly present so that the cooling fluid can flow through this void 35. The void 35 is therefore acting as a fluid passage. In this embodiment a cooling fluid inlet port 6 is present and is piercing the third section 22. Furthermore a cooling fluid outlet port 4 is shown via which the cooling fluid that is flowing through the void 35 can be exhausted into the combustion zone 16. As you can see in the example, arrows indicate the fluid direction and the width of the arrows also give an indication of the amount of fluid that flows through the void and through the ports (inlet port 6 and outlet port 4).

Preferably a larger amount of cooling fluid is flowing through the void 35 in the vicinity of the first section 20. This is indicated by wider arrows compared to arrows that are closer to the third section 22. This may be configured just by the location and direction of the fluid inlet port 6 and the fluid outlet port 4 and the shape of the struts 30.

The end face 23 may be a substantially flat or cylindrical surface, a conical surface of an outwards directed conical lateral surface or it may be a conical surface that is directed inwards of a conical lateral surface.

In the shown embodiment of FIG. 2 the rod-shaped struts 30 comprise a cylindrical section of a cylindrical shape 34 and a conical section with a conical shape 32. In this example the conical part is only a fraction of the overall length of the strut 30, for example 10 to 20% of the overall length. In other embodiments, which are not shown in FIG. 2, the conical section may be longer for example 50 to 70% or even going over the overall length of the strut 30. The conical shape is defined by the angle β which is taken between the rotational axis of the conical shape 32 and a lateral surface 33 of that conical shape 32. In the example the angle β may be roughly 25 degrees for illustration but other angles may be applicable for different configurations.

Several rows or planes of struts 30 may be present even though they are not shown in the FIG. 2. Therefore even though the figure shows a void 32 which appears to the quite hollow the overall density due to the arrangement of struts may be different than you would imagine from that given sectional view. The overall consumption of the second section 21 by material used within the struts 30 may be 15% up to 85% of the overall volume of the second section 21.

Preferably the ratio of material consumption may be 20% up to 40% of the overall volume of the second section 21.

Figure 3:
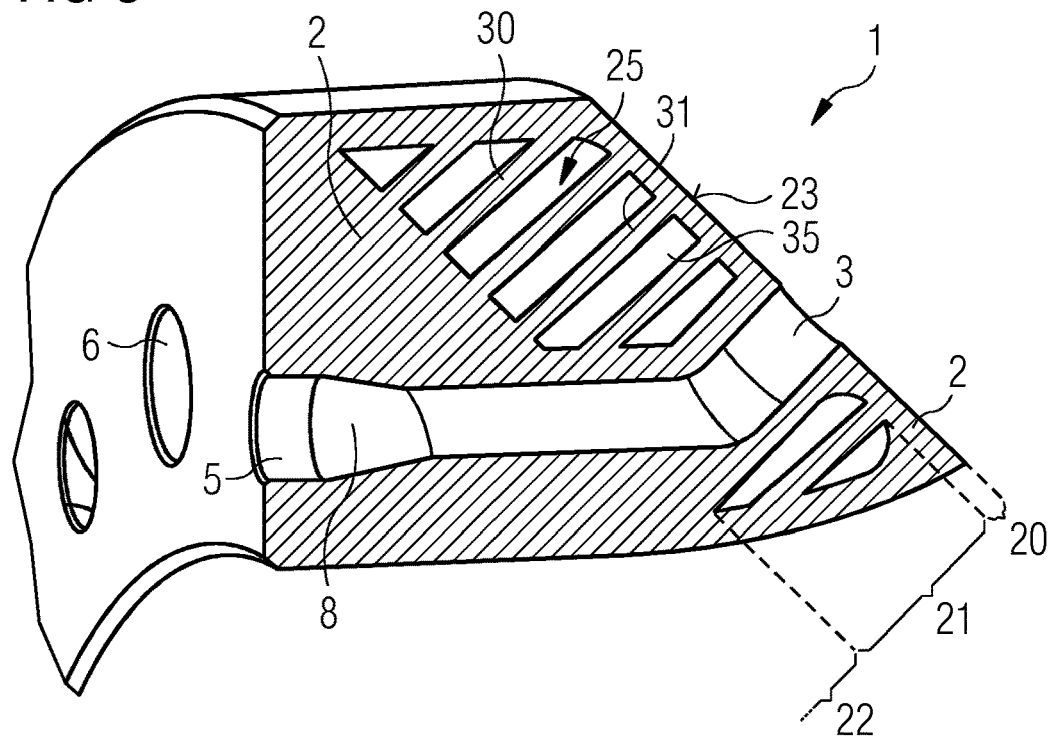
FIG. 3: shows a further embodiment of such a lattice structure in a burner head.

FIG. 3 now shows an embodiment in a sectional view of a three dimensional burner head in which a lattice structure 25 is incorporated. The burner head shows the body 2 which again has a first section 20, a second section 21 and a third section 22. In the example also a fuel supply opening is shown that also passes through the body 2. Particularly a fuel inlet port 5 and a fuel outlet port 3 are depicted in the figure. The lattice structure 25 will not affect the fuel supply. The lattice will simply be stopped in that region and then continued afterwards or surrounding the fuel supply region. Not shown in this figure are the cooling air outlet ports 4 which would be present but cannot be seen in this sectional view. The cooling fluid inlet port 6 is indicated but no clear indication can be seen in FIG. 3 that the port 6 is connected to the void 35 of the lattice structure 25. The end face 23 is following a conical shape of the overall substantially conical burner head. The burner head may be present as a pilot burner via which a pilot fuel is provided and pilot air—as the cooling fluid but also as a component for the combustion—is provided which then will be mixed in a combustion zone for stable combustion.

In this example again only a few struts 30 are shown. Further struts are not visible in this sectional view or are intentionally omitted so that the drawing can be better understood. The struts 30 here in FIG. 3 are totally cylindrical and solid components which are physically connected to the first section 20 and the third section 22. The struts 30 in the example are oriented perpendicularly to the surface of the end face 23. Nevertheless some struts may end up and will be attached to a tilted surface which will be at an angle to the end face 23.

Figure 4:
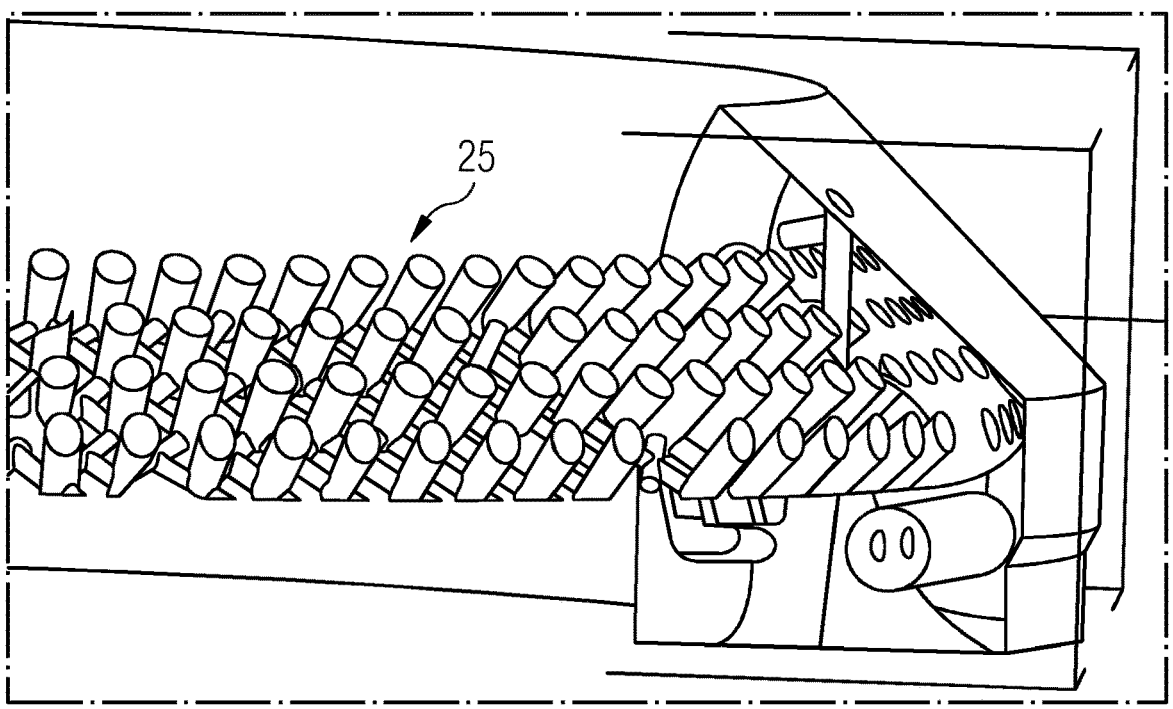
FIG. 4: shows schematically a three dimensional see-through view of a lattice structure.

FIG. 4 shows a see-through three-dimensional schematic drawing in which an exemplary lattice structure 25 is shown in parts. The lattice structure 25 itself is defined by mainly conical struts that are arranged in the periodical way. Furthermore the struts show some cross bars at a position distant to the first section 20. In this example almost half of the available space in the second region 21 is consumed by the material of the struts and the cross bars. The other half remains the void 35 to which the cooling air can be guided.

Figure 5:
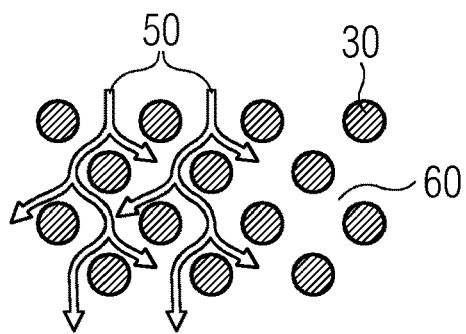
FIG. 5: shows a lattice structure and a cooling fluid flow through the lattice structure.

FIG. 5 now shows a sectional view through the lattice structure 25 as seen from the end face 23. The struts 30 are indicated by circles which show the cross section of the cylindrical struts 30. A cooling fluid flow 50 is indicated by arrows that may enter through the void 35 of the lattice structure 25. The void 35 of the lattice structure 25 therefore defines generally a—fairly complex—fluid passage 60 which will be used by the cooling fluid flow 50. As indicated in FIG. 5, the fluid flow of the cooling fluid will be in contact with the struts 30 and therefore a heat transfer will occur and heat from the struts 30 will be passed on to the cooling fluid of the cooling fluid flow 50.

Figure 6:
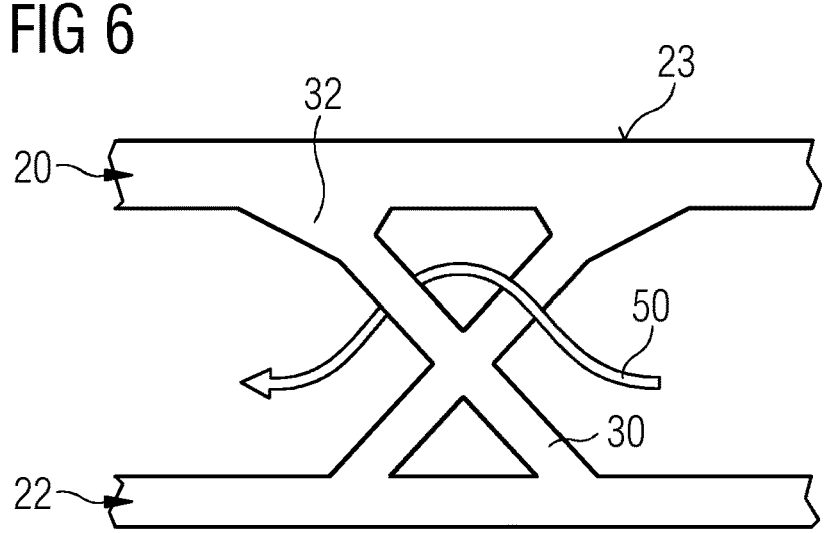
FIG. 6: shows a lattice structure with interconnected struts.

According to FIG. 6 a more complex lattice structure is shown in a schematic way. In the example struts 30 will intersect half the distance between the first section 20 and the third section 22. The intersecting point may also be at a different height of the struts 30. In the example the struts 30 which are angled in relation to the end face 23 continue to have the conical shape 32 which is inclined due to the orientation of the struts 30. A cooling fluid flow 50 is indicated in the FIG. 6 only as an example to show how the cooling fluid (i.e. air) will need to meander around the struts of the lattice structure 25. Even more complex arrangements of a lattice structure may be wanted to gain the most beneficial heat transfer functionality of the lattice structure 25.

The components of the body 2, particularly the first section 20, the second section 21 and the third section 22 will be generated as a single piece of metallic material. This complex arrangement as indicated in the previous figures can be generated by additive manufacturing, or so called 3D printing. Examples for additive manufacturing are selective laser melting or selective laser sintering via which layer by layer a powder is applied onto a surface which then will be solidified and in the end will result in a final single component built from one material. Laser sintering may allow very complex cooling features in the lattice structure 25. It is preferable to generate the complete body 2 of the turbo machine component 1 in one single production step by additive manufacturing. The result will be a monolithic component. It has to be noted that according to the invention casting is not considered to fall under the inventive concept. The term lattice structure itself is considered to define a quite complex design which cannot be produced by casting. The figures may be simplified and therefore may not exactly show that this cannot be produced by casting. Nevertheless the invention is directed to a component with a lattice structure that is particularly to be produced by additive manufacturing techniques.

Figure 7:
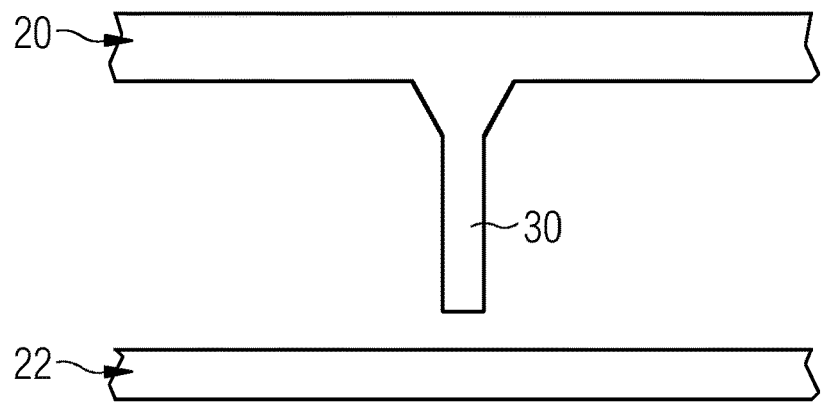
FIG. 7: shows a lattice structure with semi-detached struts.

FIG. 7 shows a different type of embodiment of a single strut 30 which shows a design in which the strut 30 is only attached to the first section 20. Therefore the strut 30 is semi-detached.

The previous shown figures show different embodiments of the invention. All of these embodiments or at least some of the embodiments have similar advantages and features which will be summarized in the following.

Figure 8:
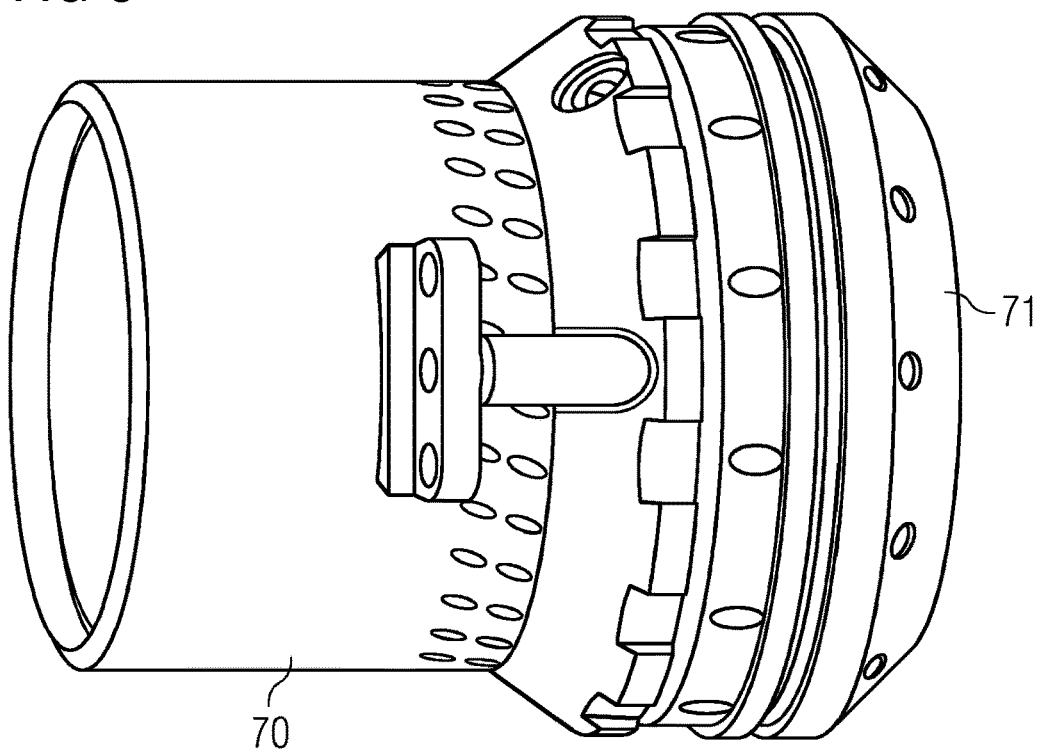
FIG. 8 shows an exemplary burner head into which the lattice structure can be embedded.
Figure 9:
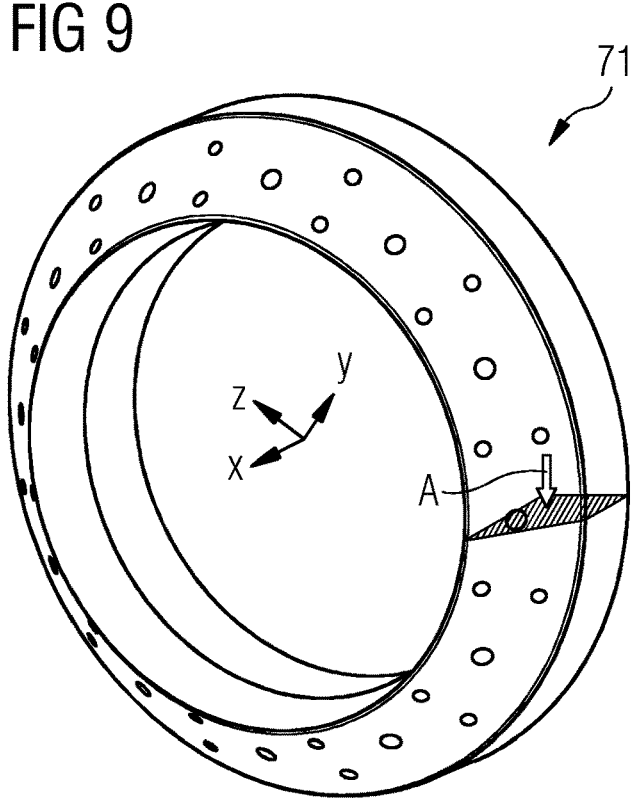
FIG. 9 shows a tip section, a pilot burner section, of the burner head as shown in FIG. 8.

Particularly the invention may be applied to a burner head 70 as shown in FIG. 8, and more particularly to a pilot burner section 71, which is also shown in FIG. 9. In FIG. 9 the view as depicted in FIG. 3 is indicated as a hatched cross section as seen from view direction A. The components as seen in FIG. 4 would be embedded in the pilot burner section 71 as shown in FIG. 9.

To summarize, efficient cooling will be gained by additive manufacturing of lattice structures attaching to the surface to be cooled. The surface to be cooled is typically exposed to combustion temperatures e.g. between 1300 and 2000° C. The cool side of the component corresponds to typical compressor exit temperatures, 350 to 550° C.

The lattice structure may particularly be applied for surfaces in the vicinity of a pilot flame, as this location is one the most hostile environments in a gas turbine. The pilot flame may be present in order to stabilize a main flame or a primary combustion zone.

The lattice structure has certain features as described above and shown in the following summary:—A more or less dense metal lattice (periodical) structure with struts characterized by an area fraction and a volume fraction.— There can be a gradient in volume fraction to optimize the cooling.—This volume fraction should also be such that its permeability to cooling media results in a pressure drop of relevance for the pilot burner cooling.—High amount of void in the lattice structure reduces the weight of the component as well as material cost.—The struts can be conical so that the thicker part connects to the "surface to be cooled" in order to optimize the conduction of heat from this surface. The angle β describes the smallest angle of the struts orientation towards the surface orientation and beta should be between 30 and 90 degrees—The struts can be fixed to the surrounding surfaces but can also be fixed towards the "surface to be cooled" and open in the opposing wall so that it is not a load bearing structure and hence avoids the risk of cracking. Thermal load is expected since temperature gradients lead to a volume expansion of the hotter parts which leads to stress in the material. The "open" end of the lattice should still block the cooling media flow through the lattice structure which can be arranged by "guides".—The struts can be staggered in their relative position towards the flow in order to optimize the cooling efficiency but at the same time stay within the required pressure drop.

The invention is particularly advantageous due to the combination of application of additive manufactured lattice structures to gas turbine hot components such as burners. Advantages are that additive manufacturing enables realizing of lattice structures virtually giving unlimited life to hot components. Additionally rapid prototyping is possible which speeds up development and that give possibility of flexibility to adapt design to individual customer requirement and introduction of new capabilities such as fuel flexibility for burners.

The invention claimed is:

1. A gas turbine burner component, comprising:
    a body with a first section, a second section and a third section, the first section, the second section, and the third section being integrally formed with each other and built from a common material, wherein each of the first section, the second section, and the third section comprises an annular shape thereby defining a central passage through the body,
    an end face of the first section of the body, wherein the end face, during operation, is exposable to a first temperature higher than a second temperature of a cooling fluid, wherein the end face tapers radially inward in a downstream direction along a longitudinal axis of the body,
    wherein the second section is located between the first section and the third section and is formed in parts as a lattice structure,
    wherein the lattice structure comprises:
        a plurality of struts, wherein each of a first set of the plurality of struts is rod-shaped and comprises a first end, the first end being connected to the first section, and wherein each of the plurality of struts projects radially inward from the first section in an upstream direction along the longitudinal axis, and
        a void penetrated by the plurality of struts, the void providing at least one fluid passage via which the cooling fluid is guidable through an interior of the second section during operation, and
        wherein the first end of each of the first set of the plurality of struts comprises a conical shape with increasing diameter in direction of the first section.

2. The gas turbine burner component according to claim 1,
    wherein the plurality of struts and/or the body are generated via additive manufacturing techniques, selective laser sintering, or selective laser melting, or electronic beam melting.

3. The gas turbine burner component according to claim 1, wherein the first set of the plurality of struts are evenly spaced.

4. The gas turbine burner component according to claim 1, wherein the conical shape of the first end of each of the first set of the plurality of struts is defined by an angle (beta) between 2 degrees and 45 degrees, the angle (beta) taken between a rotational axis of the conical shape and a lateral surface of the conical shape.

5. The gas turbine burner component according to claim 1,
    wherein the conical shape of the first end of each of the first set of the plurality of struts is followed by a cylindrical shape at a further section of each of the first set of the plurality of struts.

6. The gas turbine burner component according to claim 1,
    wherein each of the first set of the plurality of struts is arranged perpendicular to the end face or is angled between 1° to 45° in relation to a normal of the end face.

7. The gas turbine burner component according to claim 1, wherein a first subset of the first set of the plurality of struts and a second subset of the first set of the plurality of struts are staggered relative to each other.

8. The gas turbine burner component according to claim 1, comprising a second set of the plurality of struts wherein each of the second set of the plurality of struts intersect at least one of the first set of the plurality of struts.

9. The gas turbine burner component according to claim 1,
    wherein the plurality of struts are not attached to the third section.

10. The gas turbine burner component according to claim 1, wherein a ratio between a volume of solid material of the lattice structure and a volume of the void of the lattice structure in the second section is between 15% and 85%.

11. The gas turbine burner component according to claim 1, wherein a ratio between an area of the third section that is in connection with the plurality of struts and an area of the third section that is not in connection with the plurality of struts is between 35% and 120%.

12. The gas turbine burner component according to claim 1, wherein a volume of the void of the lattice structure in the second section reduces in direction towards the end face.

13. The gas turbine burner component according to claim 1,
    wherein at least one cooling fluid inlet port provides the cooling fluid into the void during operation,
    wherein at least one cooling fluid outlet port discharges the cooling fluid from the void during operation,
    wherein the at least one cooling fluid inlet port and the at least one cooling fluid outlet port are offset to each other.

14. The gas turbine burner component according to claim 1,
    wherein the second section comprises a plurality of segments, each segment enclosed by walls enclosing a portion of the lattice structure,
    wherein each segment comprises at least one distinct cooling fluid inlet port which provides the cooling fluid into the void during operation and at least one distinct cooling fluid outlet port which discharges the cooling fluid from the void during operation.

15. A method for manufacturing of a gas turbine burner component, comprising:
    generating the gas turbine burner component according to claim 1 as an integrally formed component via additive manufacturing techniques, selective laser sintering, or selective laser melting, or electron beam melting.

16. A method of operation of a gas turbine burner component according to claim 1, the method comprising:

provide the cooling fluid through the void so that the plurality of struts are affected by convection cooling.

17. The gas turbine burner component according to claim 1, wherein the conical shape of the first end of each of the first set of the plurality of struts is defined by an angle (beta) between 5 degrees and 30 degrees, the angle (beta) taken between a rotational axis of the conical shape and a lateral surface of the conical shape.

18. The gas turbine burner component according to claim 1, wherein a ratio between a volume of solid material of the lattice structure and a volume of the void of the lattice structure in the second section is between 25% and 65%.

19. The gas turbine burner component according to claim 1, wherein a ratio between an area of the third section that is in connection with the plurality of struts and an area of the third section that is not in connection with the plurality of struts is between 50% and 100%.

20. The gas turbine burner component according to claim 1, wherein at least one cooling fluid inlet port, piercing the third section, provides the cooling fluid into the void during operation, wherein at least one cooling fluid outlet port, piercing the first section, discharges the cooling fluid from the void during operation, wherein the at least one cooling fluid inlet port and the at least one cooling fluid outlet port are offset to each other.

21. The gas turbine burner component according to claim 1, wherein the second section comprises a plurality of segments each segment enclosed by walls enclosing a portion of the lattice structure, wherein each segment comprises at least one distinct cooling fluid inlet port, piercing the third section, providing the cooling fluid into the void during operation and at least one distinct cooling fluid outlet port, piercing the first section, discharges the cooling fluid from the void during operation.

* * * * *